(12) United States Patent
Ito et al.

(10) Patent No.: US 6,897,396 B2
(45) Date of Patent: May 24, 2005

(54) SWITCH GEAR AND METHOD OF MANUFACTURING THEREOF

(75) Inventors: Yoshihiro Ito, Tokyo (JP); Susumu Kinoshita, Tokyo (JP); Satoshi Makishima, Tokyo (JP); Hiroki Sekiya, Kanagawa-ken (JP); Masaru Miyagawa, Tokyo (JP); Toshio Shimizu, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/726,411

(22) Filed: Dec. 1, 2000

(65) Prior Publication Data

US 2001/0002666 A1 Jun. 7, 2001

(30) Foreign Application Priority Data

Dec. 1, 1999 (JP) .......................................... 11-342066

(51) Int. Cl.[7] .............................................. H01H 33/66
(52) U.S. Cl. ...................... 218/120; 218/140; 218/154
(58) Field of Search ............................... 218/7, 14, 118, 218/120, 123–128, 138–140, 154–156

(56) References Cited

U.S. PATENT DOCUMENTS

| | | | | |
|---|---|---|---|---|
| 3,812,314 A | * | 5/1974 | Nonken | 218/118 |
| 3,955,167 A | * | 5/1976 | Kumbera | 218/120 |
| 5,387,772 A | * | 2/1995 | Bestel | 218/118 |
| 5,597,992 A | * | 1/1997 | Walker | 218/121 |
| 5,917,167 A | | 6/1999 | Bestel | 218/138 |
| 6,268,579 B1 | * | 7/2001 | Kajiwara et al. | 218/153 |

FOREIGN PATENT DOCUMENTS

| | | |
|---|---|---|
| EP | 1 107 409 A1 | 6/2001 |
| JP | 10-210615 | 8/1998 |
| WO | WO86/00464 | 1/1986 |
| WO | WO99/18591 | 4/1999 |

OTHER PUBLICATIONS

Switchgear Catalog by HOLEC, "Modular epoxy resin insulated switchgear in sheet steel enclosure with vacuum interrupters", (no date).

* cited by examiner

*Primary Examiner*—Lincoln Donovan
(74) *Attorney, Agent, or Firm*—Finnegan, Henderson, Farabow, Garrett & Dunner, L.L.P.

(57) ABSTRACT

By molding a plurality of vacuum valves (7), (13) having differing functions together with an input member (3) and an output member (21) en bloc in a resin layer (23) to form a switch gear (1), the present invention seeks to achieve dielectric strength without resorting to the use of SF6 gas, while rendering the whole device more compact and reducing both the number of parts and the man hours required for molding.

15 Claims, 14 Drawing Sheets

SWITCH GEAR AND METHOD OF MANUFACTURING THEREOF

BACKGROUND TO THE INVENTION

1. Field of the Invention

The present invention relates to a switch gear, and more particularly to a switch gear comprising a vacuum circuit breaker, vacuum disconnector or similar vacuum switch used for interruption and continuity or switching in electric power and reception and/or distribution systems.

2. Description of the Related Art

FIG. 1 illustrates an example of the configuration of a typical switch gear as used in electric power and reception and/or distribution systems. In FIG. 1, a receptacle 101 is surrounded with mild steel plating and divided internally with a partition 103. A circuit breaker chamber 105 at the front houses a circuit breaker 109 fitted with a vacuum valve 107, while a bus-line chamber 111 at the rear is equipped with identical disconnectors 113 and 114 corresponding to upper and lower main circuits on the circuit breaker 109 side. The upper disconnector 113 side is connected to a bus-line 117 which is fixed to a supporting insulator 115, and is thence connected to a neighbouring board. The lower disconnector 114 side is connected to a cable head 121 which is fed by an electric power cable 119. These pieces of apparatus are mutually connected by means of a connecting conductor 123. In the partition 103 which separates the source side from the load side is an aperture not illustrated in the drawing is an insulating spacer 125 formed by molding the principal circuit conductor in an insulating layer, and the principal circuit is connected to the mutual partition of the chambers 105 and 111. These chambers 105 and 111 are charged with an insulating medium such as SF6 gas.

SF6 gas is characterized among other qualities by being colorless, harmless and inert. At atmospheric pressure it has 2–3 times the dielectric strength of air. A gear switch charged with a gas of this sort ensures a stable supply of electric power.

In a configuration of this sort, SF6 gas has a higher degree of dielectric strength than air, and consequently allows the switch gear to be made more compact as described for instance in Japanese Laid-Open Patent Application S60 [1985]-210107. However, at the conference on the prevention of global warming held in Kyôto in December 1997 it was revealed that its contribution to global warming is some 23000 times that of carbon dioxide gas, and it was determined that every effort should be taken to prevent it leaking or being released into the atmosphere.

This means that it is vital to ensure that the welded sections of the steel plating which seals the receptacle 101 is airtight, and that there is no gas leakage from the O-ring which is used in the gas/air section of the cable head 121. It is also necessary to collect the gas in a gas collector prior to opening the receptacle 101 for the purpose of inspecting the interior thereof. It goes without saying that these measures have been taken in apparatus which operates by the conventional method, but they become even more important and require countermeasures in order to guarantee safety.

Such measures become unnecessary if SF6 gas is not used, but the fact remains that there is no better gaseous insulation medium. For example, it is possible to use air, but this results in inferior dielectric strength. This must be resolved by increasing the insulation distance, which results in an overall enlargement of the apparatus. On the other hand, normal insulation within air is affected by dust and moisture, and the creepage distance must be increased in view of this. Such considerations run contrary to recent trends towards greater compactness in devices of this sort.

As a result, attempts have been made as in Japanese Laid-Open Patent Application H9[1997]-013027 to avoid the use of SF6 gas by adopting a configuration whereby a vacuum valve is molded directly as a solid insulator. However, this method is flawed in that it also requires the other component parts of the switch gear to be treated by molding or otherwise to insulate them, in addition to which the connections need to be treated after assembly so that the conductor does not leak. This involves a considerable number of man hours and extra cost.

SUMMARY OF THE INVENTION

Accordingly, one object of the present invention, which has been designed in response to the abovementioned problems, is to provide a novel switch gear and method of manufacturing the same which is both economical and efficient by virtue of the fact that the whole device is molded en bloc at high speed, thus reducing both the number of parts and the number of man hours required for molding. In the present invention, this is achieved thanks to the solid insulation of vacuum valves having among other functions those of vacuum circuit breaker and vacuum disconnector, thus providing a degree of dielectric strength which surpasses that of SF6 gas insulation, while at the same time rendering the whole device more compact.

That is to say, the present invention is a switch gear having a switching apparatus with a vacuum circuit breaker, vacuum disconnector or similar vacuum valve, an input member of the switching apparatus whereby electric power is input from the exterior, and an output member of the switching apparatus whereby electric power is output to the exterior, the whole switching apparatus being molded en bloc in a resin layer together with the input member and the output member.

This allows the functions of vacuum circuit breaker, vacuum disconnector and earth to be implemented by vacuum valves which switch connections within a vacuum. Hereinafter, the term "vacuum valves" sometimes means "vacuum interrupter" or "vacuum disconnector". If the valves are assembled as they are, the distance between them has to be increased in accordance with the dielectric strength of air. Molding two vacuum valves with differing functions en bloc allows the insulation between the valves to be determined by the dielectric strength of the resin used in the molding. The dielectric strength of the molded resin is approximately one digit higher than that of air or SF6 gas. This means that the insulation distance of the vacuum valves which correspond to the nerve center of the switch gear can be greatly reduced, allowing the whole device to be rendered more compact. Meanwhile, when two vacuum valves are assembled to form a switch gear, it is important that their relative positions be determined accurately. Failure to do so may lead to serious problems resulting from divergent timing and uneven contact when the contacts within the vacuum valves are switched. As a result, a great deal of time is wasted on ensuring accurate dimensions during assembly. By molding the vacuum valves en bloc it is possible to dispense with troublesome adjustments after molding, because the dimensions are determined automatically. Moreover, a switch gear must perforce have an input member and an output member, and by molding the input and output members en bloc with the vacuum valves it is possible to insulate them with the outer surface, thus rendering insulation treatment of the connecting members unnecessary. This has the advantage of allowing the method of connection to be selected from among screws, welding, pressure connection, contact and a variety of other methods in line with the demands of productivity and economy. What is more, insulating the connecting members en bloc in solid resin results in cost saving thanks to the greater degree of compactness and the fact that the process of molding is all completed at once.

Moreover, in the present invention the outer surface of the molded resin layer forms an earth layer.

By the formation of an earth layer from the surface of the molded resin except for the vicinity of the vacuum valve movable conductor and connecting parts for the input and output members, the area between the conductor and the vacuum valves within the molded resin becomes a solid resin insulator, permitting of greater compactness in comparison with air and other gaseous insulators. Moreover, where the device has three phases, the three are separated when an earth layer is formed on the outer surface of each phase, eliminating inter-phase shorting and doing away with the need for any distance between the phases. This also allows the device to be made more compact, as does the fact that it is no longer necessary to pay any attention to soiling or damage when designing the device as they do not affect its insulation properties. What is more, it also does away with the need for maintenance against soiling and damage. There is a further advantage in that there is no need for the board itself to be airtight, which permits simplification of structure and manufacture.

In the switch gear to which the present invention pertains, the input and output members form a T-junction.

Forming a T-junction in this manner ensures ample variation in the input and output members, enabling the fitting of current transformers and arresters without modifying the mold. The fact that the same T-junction conductor is used in both the inlet and outlet members makes for economy of manufacture because the parts may be standardized or may be used commonly. In particular it helps to curb waste because there are many types of switch gear system, and it would otherwise be necessary to prepare a new mold for each of them.

Moreover, in the present invention the mold used in molding the switch gear is such that at least the input and output members are interchangeable, and the gear switch can be molded en bloc in accordance with the structure and shape of the input and output members.

In this manner, it frequently happens that the direction of the bus-line (generating line) side (input member) and output member (cable head) side of a switch gear differ, but by fashioning the mold of the input and output members so that it can be separated, allowing it to be attached to and detached from the main mold, it becomes possible to change the arrangement of the input and output members in three-phase state so that they do not overlap. A single mold made to include the main section of the switch gear also is larger and more expensive to manufacture, while the set-up time involved also increases, but by preparing a separate mold for the input and output members and changing this according to the desired application not only is the cost of the mold reduced, but also it becomes easier to change and requires less storage space when not in use.

In the present invention it is also possible to mold the switch gear en bloc in such a manner that the current and voltage sensors double as supporting members for the conductor member.

Thus, by allowing the current and voltage sensors to double as supporting members for the conductor member the device becomes more cost-effective because there is no longer any need to mold the current and voltage sensors separately. What is more, because the main body of the switch gear and the insulating medium form a single solid insulator, the dielectric strength increases and it is possible to reduce the dimensions of the switch gear including the voltage and current sensors. Furthermore, while it is normally necessary with an internal conductor to use a spacer in order to maintain insulation distance, or to increase the rigidity of the conductor and allow it to float in space within the mold, by allocating this function to voltage and current sensors it is possible to do away with the spacer and there is no need for the conductor to be particularly rigid, making it easier and more economical to manufacture.

In the present invention, a more economical switch gear can be provided if a molded potential transformer(PT or VT(voltage transformer)) or arrester is fitted to one side of the T-junction.

This makes it possible to provide a more economical switch gear because a wider variety of system configurations can be provided without any need to change the main mold.

In the present invention, electrically conductive metal caps are fitted to both end surfaces of the vacuum valve in such a manner as to cover the end surfaces of the insulation tube thereof, these being included with the other parts and molded en bloc.

As a result, while the thermal stress in the axial direction is great at both ends of the vacuum valve, the presence of a cap mitigates it on the outside, allowing it to be withstood. Inasmuch as both ends of the vacuum valve are made of metal, stress is easily generated when it is molded in resin on account of the contact between different materials. This stress increases with length, but if a metal cap is fitted there is no risk of insulation breakdown even if peeling or cracking occurs between this metal cap and the end of the valve because in electrical terms the cap and the end of the valve have the same potential.

In the present invention, an elastomer is introduced into the area between both the end surfaces of the vacuum valve and the electrically conductive metal caps fitted thereto, while a high-strength fiber material is wrapped round between the end surfaces of the electrically conductive metal caps and the insulation tube of the vacuum valve so as to cover the end surfaces of the insulation tube, these being included with the other parts and molded en bloc.

Not only does elastomer introduced between the metal caps and both ends of the vacuum valve make it possible to mitigate stress generated in the axial direction, but stress generated in the elastomer and the ends of the vacuum valve is born by the high-strength fiber material, so that this section is stronger than the molded resin. Moreover, crack resistance is improved because the end surfaces do not directly enter the molded resin, thus not forming notches.

In the present invention, the bulking agent (or filler)for the molded resin comprises a fused silica bulking agent and fine elastomer particles, the latter being dispersed in a proportion of approximately 5–20% to the resin.

In this manner, fine particles of elastomer enter into the molded resin with the inorganic particle bulking agent, making it possible to improve the toughness of the resin and its crack resistance when molded.

In the present invention, the switch gear is molded en bloc by means of high-speed molding wherein an accelerator is added to the resin in order to promote a reaction on the upside of 100° C., the interior of the mold is depressurized, the resin poured in and the mold released after 20–30 minutes.

In this manner the molded resin is pressurized and cured successively from the section farthest from the sprue, resin being added continuously so as to provide a product without sink mark in a short time. Depressurising the interior of the metal mold while molding en bloc allows air to be expelled from inside, thus minimizing the occurrence of voids, while the difference in pressure while the resin is being poured facilitates pouring from the bottom. Once poured, the resin absorbs heat from the metal mold and increases in temperature, so that the resin which was poured first is cured more rapidly than the resin nearer the sprue, and gelates quickly. As it hardens, the resin contracts and sink marks appear unless more resin is added. The fact that the resin nearer the sprue is slow to harden allows more resin to be added, thus making it possible to provide a product without sink marks.

In the present invention, the switch gear is molded en bloc by high-speed molding using a metal mold with a plurality of resin inlets, resin pools and deaeration members.

Having a plurality of resin inlets and corresponding number of resin pools and deaeration members makes it possible to remove bubbles around the vacuum valves in the metal mold and to form a solid insulation layer without any voids. If there is only one inlet when a plurality of vacuum valves is being molded en bloc, bubbles resulting from cavitation sometimes remain unless the temperature of the metal mold is lowered and the resin is poured slowly. This leads to faults in the solid insulation layer. By supplying a plurality of inlets it is possible successively to drive any bubbles to the relevant resin pool and deaeration member, thus facilitating the production of a switch gear molded en bloc and free from voids.

In the present invention, an electrically conductive coating is sprayed on to the face of the metal mold corresponding to the outer surface of the switch gear, whereupon the component parts of the switch gear are set in the metal mold and molded en bloc in such a manner that the electrically conductive coating is transferred to the outer surface of the resin, forming a single entity with the molded resin layer.

Spraying the part of the metal mold which corresponds to the surface of the molded product in advance with an electrically conductive coating allows the resin and electrically conductive coating to adhere within the mold when subsequently the metal mold is closed and the resin poured in, so that when the mold is released, the surface of the molded resin and the coating form a single entity. This is economical because it eliminates the process of forming the electrically conductive layer after molding is complete.

In the present invention, when the switch gear is molded en bloc in resin and the resin has gelated, the mold is released sufficiently for the electrically conductive coating to fluidize, after which the coating is forced into the space between the molded product and the metal mold, whereupon the mold is closed to the thickness of an electrically conductive layer and heat-cured in order to form the electrically conductive layer on the outer surface of the molded product.

Thus, when pouring the electrically conductive coating in through the inlet of the metal mold, it is possible to ensure that the coating is formed correctly by doing so under pressure into the narrow gap between the molded product and the metal mold. This means that adhesive properties are good, and a firm electrically conductive layer is able to form because the molded resin is also heated to above the glass transition temperature. Accordingly, it is possible to provide a molded product with an economical surface earth layer, because the reliability of the fixed insulation layer can be improved and the thickness of the electrically conductive layer adjusted.

Moreover, according to the present invention, when the switch gear is being molded en bloc in resin, the mold is released when the molded resin has gelated, and the surface of the molded product is covered with an electrically pre-impregnated conductive sheet (that is to say, prepreg conductive sheet), after which the metal mold is clamped, and the electrically prepreg conductive sheet heated and pressurized, thus ensuring that it forms a single entity with the molded product, on the surface of which an electrically conductive layer is created In the present invention, when the switch gear is molded en bloc in resin and the resin has gelated, the metal mold is released and the surface of the molded product is covered with a pre-impregnated electrically conductive sheet, after which the mold is clamped, heat and pressure being applied to the sheet in order for it to form an entity with the molded product.

In this manner the pre-impregnated electrically conductive sheet (that is to say, prepreg conductive sheet) acts as a protective layer for the molded surface, at the same time enabling it to be formed to a prescribed thickness. The fact that the thickness is uniform means that the rate of conduction is stable, and the use of high-strength fibers in the pre-impregnated material also serves to prevent breakage.

In the present invention wherein a plurality of vacuum valves are molded en bloc, the movable sides of the vacuum valves are arranged in the same direction, the connecting members including sliding members on the movable side comprising a single conductor, which is molded en bloc with the vacuum valves.

Thus, because the connecting members including sliding members and the movable side of the vacuum valves are assembled and set in the metal mold prior to molding, the positional relationship is determined in the metal mold, thus eliminating the troublesome task of adjusting the dimensions. Moreover, as the movable sides of the two vacuum valves are arranged in the same direction, the ends of the movable sides are easily supported by the metal members, and it is easy to mitigate the electric fields at the ends. What is more, because the connecting members are molded and insulated at the same time, it is possible to reduce the exposed sections of the movable sides, and consequently also the task of insulation in subsequent processing.

In the present invention, the outer surface of the molded switch gear assumes the shape of a fin for the purpose of cooling.

In this manner, the fact that a fin is attached to the surface of the molded product means that the surface area which comes into contact with the air is increased, improving the cooling performance and allowing the switch gear to be made more compact.

In the present invention, a metal fin is placed on the outer surface during the molding of the switch gear, which is then molded en bloc along with the metal fin.

The metal fin exhibits superior heat conductivity to organic materials such as molded resin, with resultant improved cooling efficiency. Moreover, because the fin is made of metal, it will now break if knocked, permitting greater stability of quality during movement and transportation.

In the present invention, metal is embedded in the outer surface during the molding of the switch gear, and a heat pipe with a fin is attached thereto.

The presence of the heat pipe with attached cooling fin makes it easier to cool the interior of the molded product, thus increasing the capacity of the switch gear.

In the present invention, the switch gear is assembled in a three-phase shape with the aid of the heat pipe with fin, and fixed to the face of a board on both sides also with the aid of the heat pipe.

Using the heat pipe with attached fin when assembling the switch gear into three-phase shape not only serves to improve cooling within the board, but also the fact that the board itself acts as a heat release surface, allows the cooling area to be increased, improving efficiency of cooling and allowing the switch gear to be made more compact.

In the present invention, a sealed heat pipe connected to a vacuum valve is employed within the switch gear.

This ensures that the heat of the conductor, connecting members and contact members, which are the sources of heat in the switch gear, are uniform. In this manner the density of the heat flow in the molded resin layer is averaged out, and the effective cooling area of the surface of the molded product is increased. As a result it is possible to make the switch gear more compact.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

With reference now to the drawings, wherein like codes denote identical or corresponding parts throughout the several views, and more particularly to FIG. 2 thereof, one embodiment of the present invention will be described.

Figure 1:
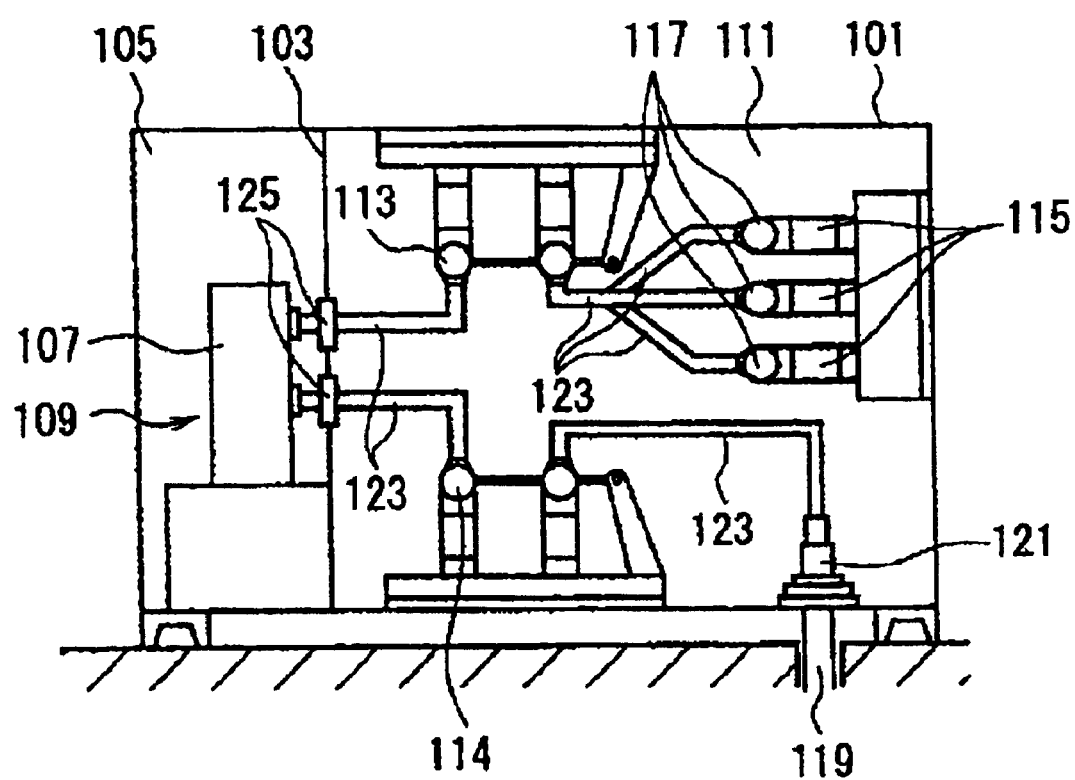
FIG. 1 is a cross-sectional drawing illustrating a conventional switch gear filled with SF6 gas.
Figure 2:
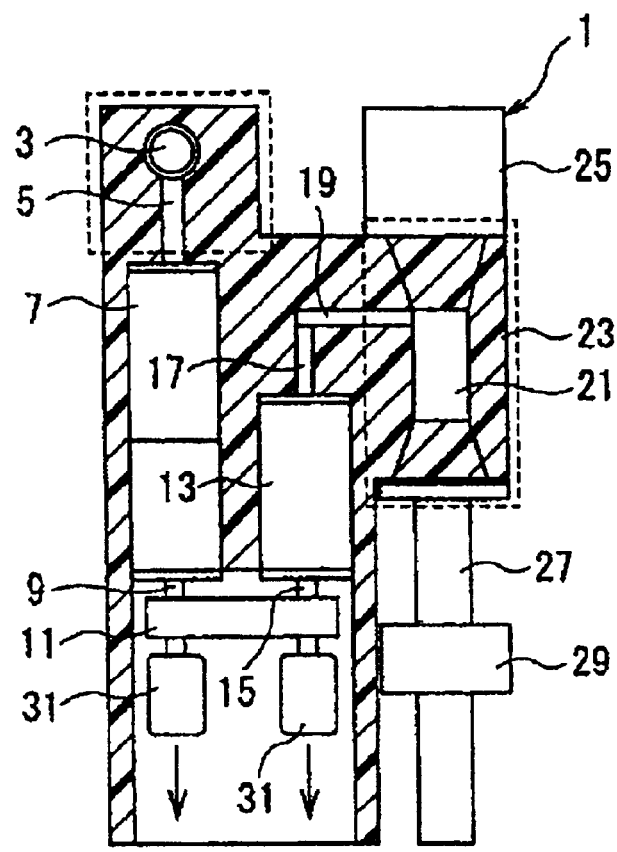
FIG. 2 is a cross-sectional drawing of the principal section of a switch gear illustrating the first embodiment of the present invention.
Figure 3:
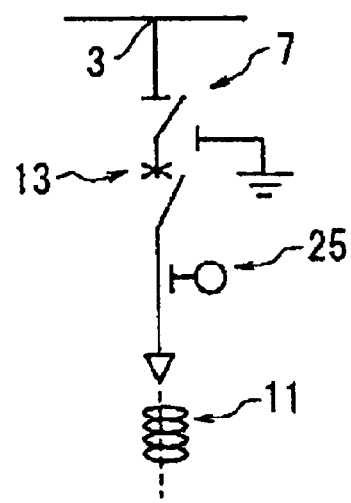
FIG. 3 is a one-line diagram of a switch gear.

FIG. 2 is a cross-sectional drawing of the principal section of a switch gear illustrating the first embodiment of the present invention, and FIG. 3 is a one-line diagram of a switch gear. FIG. 2 shows a cross-section of one phase of a switch gear 1. From the bus-line connecting member 3 a fixed conductor forming an electrode divides into a T-shape junction and connects to a vacuum disconnector 7 having an earth function. A movable-side conductor 9 which forms the electrode of the vacuum valve which constitutes the vacuum disconnector 7 connects by way of a multi-contact band or other connecting member 11 to a movable-side conductor 15 which forms the electrode of a vacuum valve 13 which constitutes a vacuum circuit breaker. A fixed conductor 17 of the vacuum valve 13 connects by way of a conductor 19 to a T-junction cable head receptor 21.

Figure 4:
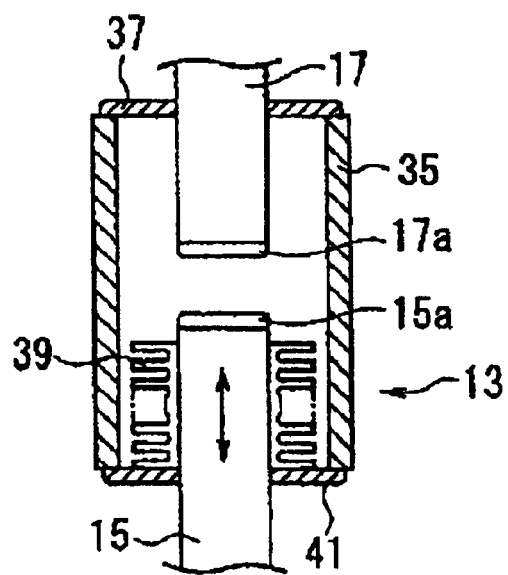
FIG. 4 is an outline cross-sectional drawing of the vacuum circuit breaker employed in the present invention.
Figure 5:
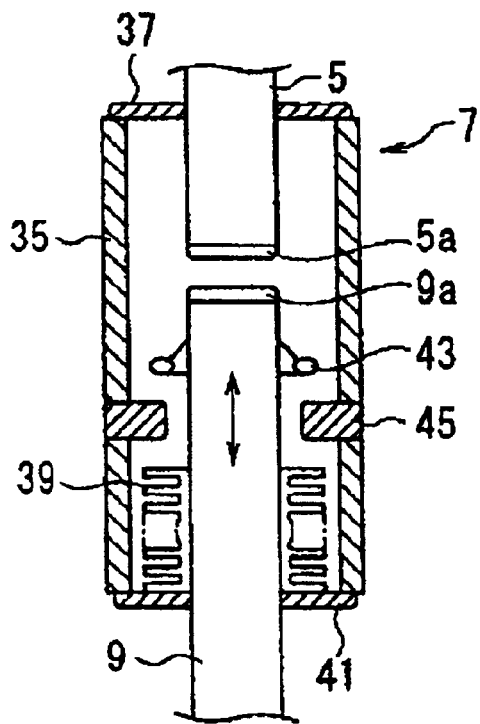
FIG. 5 is an outline cross-sectional drawing of the vacuum disconnector with built-in earth function employed in the present invention.

With a connection established from the bus-line (generating line) connecting member 3 to the cable head receptor 21, a single molded product is obtained by introducing the above into a mold not illustrated in the drawing, pouring resin 23 S into the metal mold and heat-curing it. In this case it is desirable that the bus-line connecting member 3 and the cable head receptor 21, which form the input and output respectively, are such that they are capable of being molded in interchangeable metal molds. After molding is completed, an electrically conductive layer is provided on the outer surface of the molded resin except for the inner face on the movable side of the vacuum valves 7, 13 and the section where the bus-line connecting member 3 and the cable head receptor 21 engage. To the upper side of the cable head receptor 21 is attached a molded voltage transformer (VT) or potential transformer (PT) 25, or a voltage device (VD) or potential device (PD), while a cable 27 is attached to the opposite or lower side in the drawing, and a current transformer 29 is attached to the cable 27 to complete the configuration of the switch gear illustrated in FIG. 3. The movable side conductors 9, 15 of the vacuum disconnector 7 and vacuum valve 13 of circuit breaker respectively are connected by way of a operational insulating rod 31 to an operational mechanism not illustrated in the drawing. FIG. 4 is an outline cross-sectional drawing of vacuum valve 13 for the vacuum circuit breaker employed in the present invention. Within a ceramic or similar inorganic insulation tube 35 are located a fixed conductor 17 and a movable conductor 15 with respective contact electrodes 17a and 15a, the conductor 17 being fixed to a metal endplate 37. The movable conductor 15 is supported on a metal endplate 41 in such a manner as to be capable of moving up and down with the aid of expandable bellows 39. The upper and lower metal endplates 39 and 41 are welded to the insulation tube 35 in a state of vacuum, which is preserved within the circuit breaker. FIG. 5 is an outline cross-sectional drawing of vacuum valve 7 for the vacuum disconnector with built-in earth function employed in the present invention. It is configured in such a manner as to have a contact electrode 9a facing the contact electrode 5a of the fixed conductor 5, an earth electrode 45 also being attached to the insulation tube 35 side. Disconnection and earthing are achieved by moving the movable side conductor 9 up and down. All the other compositional elements are the same as in FIG. 4, for which reason any further explanation is omitted.

Thus, a molded product wherein T-junction input and output members 3 and 21 respectively connected to two vacuum valves 7 and 13 with differing functions are molded en bloc is fitted with movable side conductors 9 and 15, a connecting member 11 and an operational rod 31 and assembled on an operational mechanism not illustrated in the drawings to form a switch gear.

In the circuit configuration illustrated in FIG. 3, a voltage transformer (VT) 25 molded en bloc is attached to the upper side of the cable head receptor 21. A current transformer (CT) 29 also molded en bloc is attached to allow the cable 27 through. It should be added that if there is no need to attach a molded voltage transformer (VT) 25, it is possible to attach an insulation plug, which can be used to connect an external power supply when testing the cables, or to fit an arrester to this section.

Figure 6:
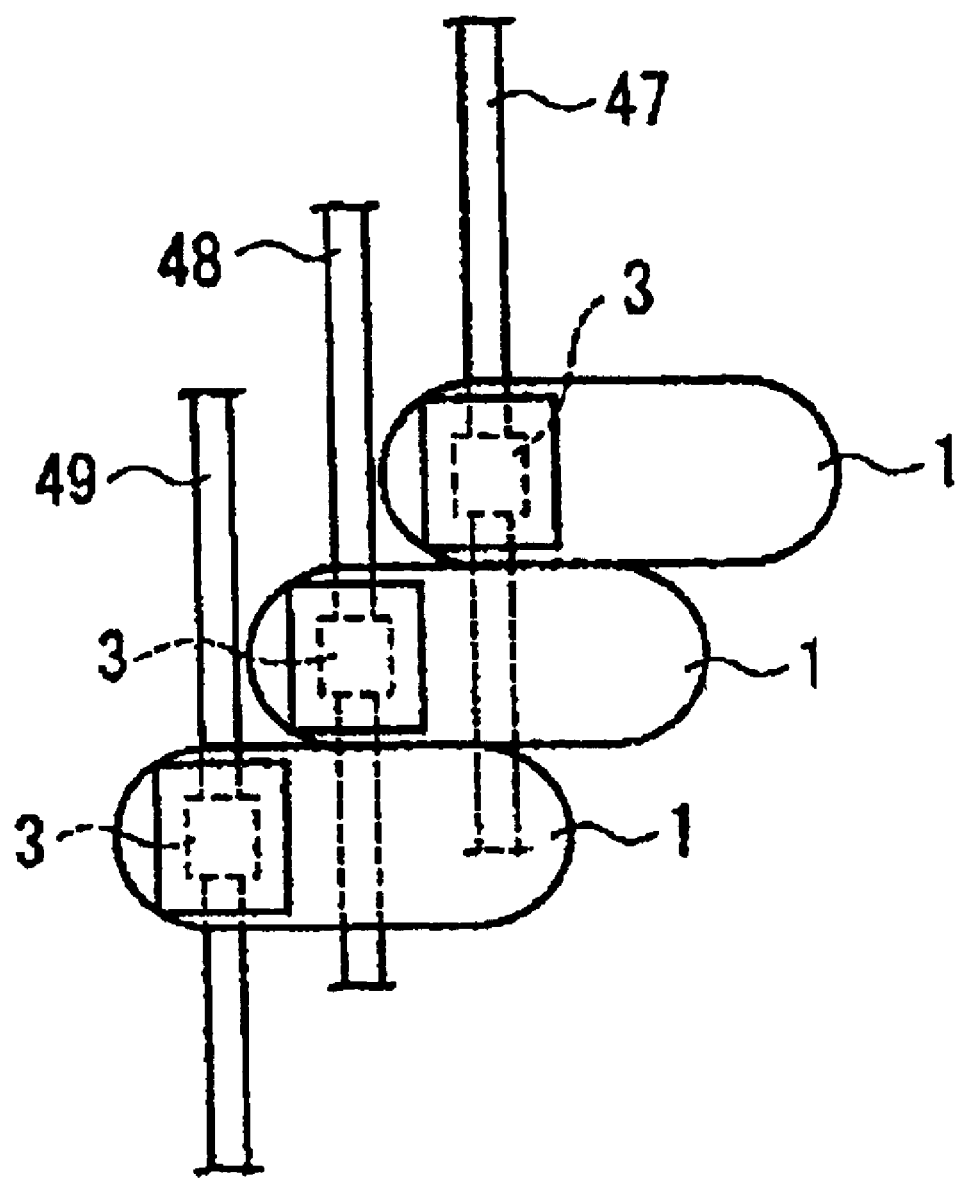
FIG. 6 is an outline drawing of a three-phase configuration of the first embodiment of the present invention.

In a three-phase layout, as may be seen from FIG. 6, a three-phase switch gear can be configured by staggering molded one-phase switch-gears 1 left and right as illustrated so that the bus-lines 47, 48 and 49 do not overlap one another.

A switch gear 1 configured in this manner requires circuit breaking, disconnecting and earthing functions, and because switching is performed within a vacuum with excellent characteristics, these various functions can be implemented with the aid of the small vacuum valves 7 and 13. These vacuum valves 7 and 13 need to be insulated on account of the high surge voltage which is generated between the electrodes and in the earth on connection and disconnection, but thanks to the fact that the charging element is covered with molded resin with a high degree of dielectric strength, the insulation distance can be less than that required when insulation is achieved with the aid of air or another gas. In particular, the fact that the surface forms an earth layer means that the insulation distance is dependent on the dielectric strength of the molded resin 23, which has approximately ten times the dielectric strength of air. Dielectric strength is higher also than that of SF6 gas, allowing the overall dimensions to be reduced. In this manner it is possible to provide the environmentally friendly switch gear 1 which has a compact configuration despite not using SF6 gas. Meanwhile, when the two vacuum valves 7 and 13 are assembled to form a switch gear, it is important that their relative positions be determined accurately. Failure to do so may lead to serious problems resulting from divergent timing and uneven contact when the contacts 15a, 17a and 5a, 9a within the vacuum valves 7 and 13 are switched. As a result, a great deal of time is wasted on ensuring accurate dimensions during assembly. By molding the vacuum valves 7 and 13 en bloc it is possible to dispense with troublesome adjustments after molding, because the dimensions are determined automatically. Moreover, the switch gear 1 which must perforce have an input member 3 and an output member 21, and by molding the input and output members 3 and 21 en bloc with the vacuum valves 7 and 13 it is possible to insulate them with the outer surface, thus eliminating the need for accuracy in pressure adjustment and the surface condition of the contact elements as when connecting parts have been insulated separately. What is more, molding the vacuum valves 7 and 13 en bloc with the input and output members 3 and 21 is more economical because the process of molding is all completed at once. In addition, the fact that the input and output members 3 and 21 are configured as a T-junction allows them to be endowed with different functions by varying the constituent parts which fit here.

Meanwhile, connecting the bus-lines 47, 48 and 49 as shown in FIG. 6 by staggering the molded switch gears 1, 1 and 1 so that the bus-line connecting members 3 do not overlap one another allows the same metal mold to be used, eliminating trouble during the process of manufacture. The configuration illustrated in FIG. 3 has been adopted for the purpose of the present embodiment, but it goes without saying that if only one vacuum valve is needed, as where only the circuit breaking function is required or where disconnecting and circuit breaking functions can be achieved with a single vacuum valve, it can be manufactured using the same metal mold by making the vacuum valve 7 in the configuration illustrated in FIG. 7 into a conductor.

There follows a description of a second embodiment with reference to FIGS. 7–12.

Figure 7:
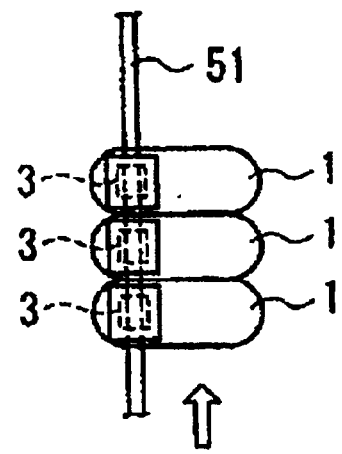
FIG. 7 is an outline drawing of a three-phase configuration of the second embodiment of the present invention.
Figure 8:
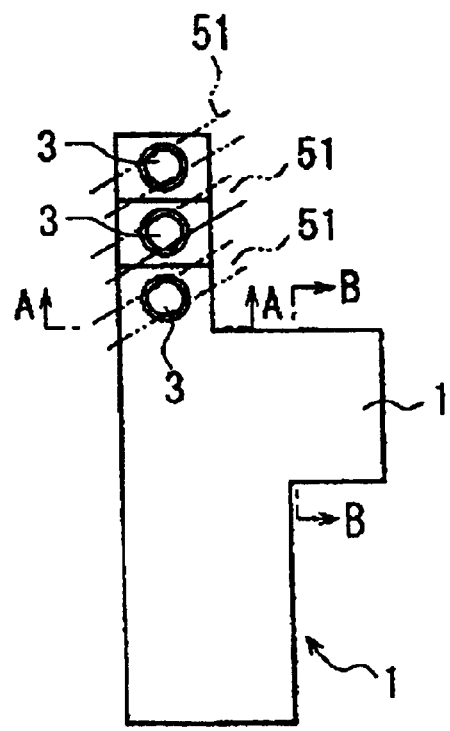
FIG. 8 is an outline sagittal drawing of the switch gear in FIG. 6.
Figure 9:
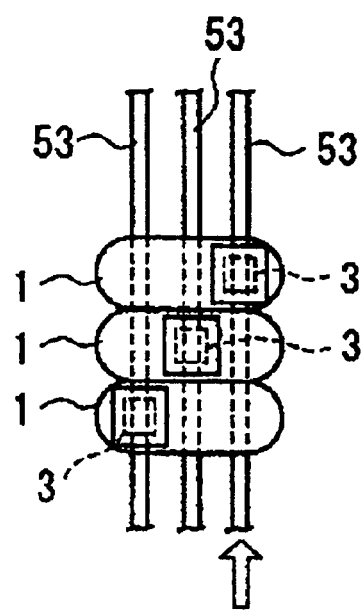
FIG. 9 is an outline drawing of a three-phase configuration illustrating a modification of the second embodiment of the present invention.
Figure 10:
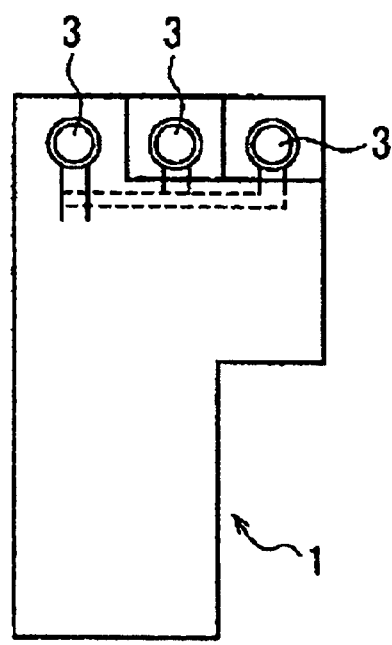
FIG. 10 is an outline sagittal drawing of the switch gear in FIG. 9.
Figure 11:
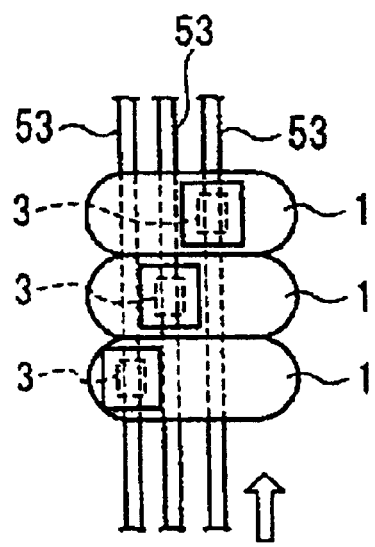
FIG. 11 is an outline drawing of a three-phase configuration illustrating a further modification of the second embodiment of the present invention.
Figure 12:
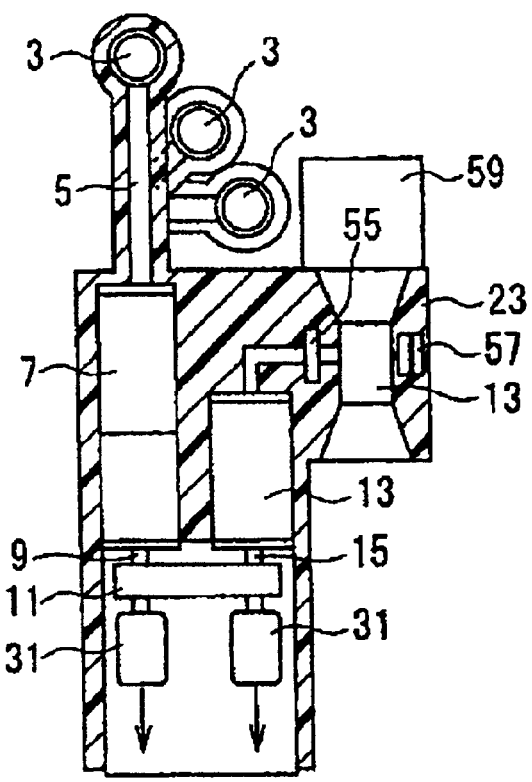
FIG. 12 is an outline sagittal drawing of the switch gear in FIG. 11.

FIG. 7 is a top view of a three-phase configuration of the switch gear 1, while FIG. 8 is a frontal view of FIG. 7 seen from the direction of the arrow. The respective input members (bus-line connecting members) 3 of the molded switch gears 1 are arranged in such a manner that the bus-lines 51 do not overlap one another in the vertical direction. In this case, a separate metal mold is used to form area A in FIG. 8 for each phase in addition to the main metal mold which is used to form the vacuum valves 7 and 13 and other elements which make up the main body of the switch gear 1 as in the first embodiment. In the mold, the length connecting the vacuum valve 7 within the main body and the fixed conductor 5 of the bus-line connecting member 3 are altered in accordance with the type of bus-line connecting member 3. Thus, by changing the metal mold of the bus-line connecting member 3 it is possible to provide a switch gear molded en bloc and housing three phases in a rectangular floor area as in FIG. 7 without altering the circuit breaking, disconnecting and earthing functions. The embodiment illustrated in FIG. 8 has been explained by modifying the metal mold in section A, but it goes without saying that a switch gear can easily be provided changing the mold of the output member (cable head receptor member) in section B and varying the direction on the cable side in the same manner.

In the second embodiment, the input member 3 and output member 21 are changed phase by phase, so that it can be arranged in three phases without the bus-line and cable overlapping, thus allowing dead space to be minimized by virtue of the fact that the floor area is rectangular in shape. What is more, molding and set-up costs can be reduced simply by making partial alterations to the input and output members 3, 21 without any need to change the overall shape of the metal mold. Furthermore, it is also possible to cut parts costs because with the exception of the fixed conductor 5 all can be used irrespective of phase change.

The second embodiment has been described hitherto in terms of FIGS. 7 and 8 where the bus-line is arranged vertically. However, it may also be arranged horizontally as in FIGS. 9 and 10, with the same effect as in FIGS. 7 and 8. It goes without saying that the same is true if it is arranged diagonally as in FIGS. 11 and 12. In this embodiment, it is possible to reduce the external dimensions of the current sensor 55 and voltage sensor 57 alone by arranging the current sensor 55 on the conductor from the vacuum valve 13 to the cable head receptor 13, arranging the voltage sensor 57 and molding them en bloc. It is also possible for instance to attach an arrester 59 to the top of the molded resin 23, thus enhancing the accessory functions of the switch gear 1. In such a case, the current sensor 55 can be a through-type transformer or Rogowsky coil, the latter being suitable where space is limited. For the voltage sensor 57 all that needs to be arranged is an electrode or voltage divider with a ceramic capacitor, the voltage divider making use of the static capacity of the molded resin. Both the sensors are arranged around the charge member, and have a low voltage or earth member, which allows them to double as supporting member for the conductor, thus making it possible to reduce the numbers of such supporting members. By allowing the metal mold for the output member 21 to be replaced in this manner by the metal mold for the main body it is possible to select the system without altering the production cost of the switch gear 1.

FIGS. 13–16 illustrate a third embodiment of the present invention.

Figure 13:
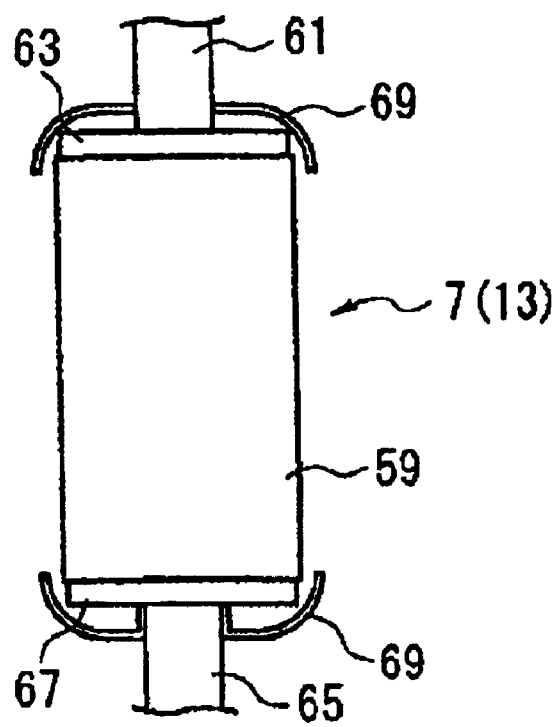
FIG. 13 is an outline drawing of a vacuum valve member illustrating a third embodiment of the present invention.
Figure 14:
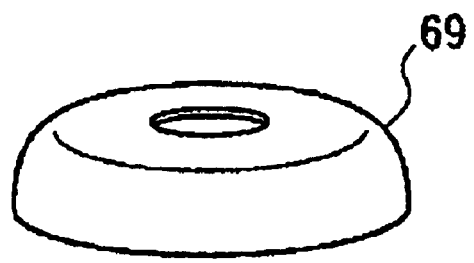
FIG. 14 is an outline drawing of a cap employed in the third embodiment of the present invention.

The third embodiment concerns the end shape of the vacuum valves 3 and 17 made of ceramic material as in FIGS. 4 and 5 when they are molded en bloc. FIG. 13 is an outline cross-sectional view illustrating a vacuum valve 7 or 13 which is to be molded en bloc (the interior of the insulation tube has been omitted). To a ceramic insulation tube 59 is sealed and attached within a vacuum a movable side endplate 67, to which in turn are attached a fixed side endplate 63 with fixed conductor 61, a movable side conductor 65 and bellows, which are not illustrated in the drawing. This forms the vacuum valve 7 or 13, to both ends of which are attached metal caps 69 made of copper or a similar metallic material. FIG. 14 is an outline drawing of a the metal cap 69. By assembling vacuum valves 7 and 13 with attached metal caps 69 of this sort and molding them en bloc with particulate epoxy molding material in which elastomer particles have been dispersed, the switch gear 1 is obtained. Examples of elastomer particles include Kureha EXL 2314 and Nihon Gôsei Gomu (Japan Synthetic Rubber: JSR) FX 602. Kureha EXL 2314 is dispersed at an optimum ratio of 10% in an epoxy resin with fused silica particles as a filler and a glass transition temperature of 135° C., thus allowing the toughness value to rise from 1.8 MPam$^{1/2}$ to 2.5 MPam$^{1/2}$. With the aid of this resin a switch gear with excellent properties of crack resistance was obtained. Molding was implemented by introducing the resin into the metal mold within a vacuum and performing primary curing in a curing oven. The mold may then be released and secondary curing performed, but instead resin to which an amine complex of boron trichloride had been added as an accelerator to promote reactivity in the epoxy resin at high temperatures was mixed in, the interior of the mold was decompressed at 130° C., and resin which had been defoamed at 50–60° C. poured in under pressure from the bottom of the mold, 30 minutes after which it was possible to release the mold. Secondary curing was then performed at 140–150° C. to produce a switch gear.

In the third embodiment, it is possible by virtue of the fact that metal caps 69 are attached to both ends of the vacuum valves 7 and 13 to ensure that the point of maximum occurrence of heat stress due to the difference in the rate of linear expansion between the ceramic material and the resin comes between the vacuum valves 7 and 13 and the metal caps 69, thus allowing the vacuum valves 7 and 13 to be used irrespective of the end shapes thereof. Moreover, while the rate of linear expansion in a resin employing a particulate bulking agent is roughly equivalent only to that of copper, its fracture toughness can be improved by dispersing about 10 phr 0.5–5 $\mu$m fine elastomer particles. The amount of fine elastomer particles added varies according to particle size, type and particle size of the bulking agent, type of resin and other factors, apart from which both strength and elasticity vary, so that it is difficult to specify the optimum values. However, experiments performed by the authors of the present invention point to 5–20 phr as effective for molding the vacuum valves 7 and 13 en bloc. Inasmuch as it is a particulate bulking agent, foreign materials can also be removed during the process. It is also possible to pour the resin under pressure using a high-speed pressurized gel type mold, which yielded a uniform resin layer after curing. The addition of fine elastomer particles has the effect of lowering elasticity, thus facilitating a corresponding reduction in heat stress. The fitting of metal caps 69 to the vacuum valves 7 and 13 means that maximum stress is generated between the endplates and the caps. Even if peeling and cracking occur in this area, there is no effect in terms of insulation because the metal caps 69 and the endplates have the same potential. What is more, the fact that the fracture toughness of the molded resin increases means that any peeling or other faults occurring in this area do not escalate into fissures. If the vacuum valves 7 and 13 are molded without fitting any metal caps 69, fracture toughness is low with only silica or a similar particulate bulking agent. For this reason a buffer layer may be provided around the vacuum valves 7 and 13 or alternatively milled glass fibers or short fibers may be added to the bulking agent in order to improve toughness before molding. However, the former is time-consuming and troublesome, while with the latter it is often impossible to manage stability of quality. This is due to inability to control dispersion of the bulking agent when pouring the resin under pressure as in high-speed molding, which leads to cracking. Moreover, any admixture of foreign bodies cannot be filtered out. With particulate molding materials, on the other hand, foreign materials can be removed by filtering, and the bulking agent is dispersed even in high-speed molding, making it possible to provide a molded product of stable quality.

Figure 15:
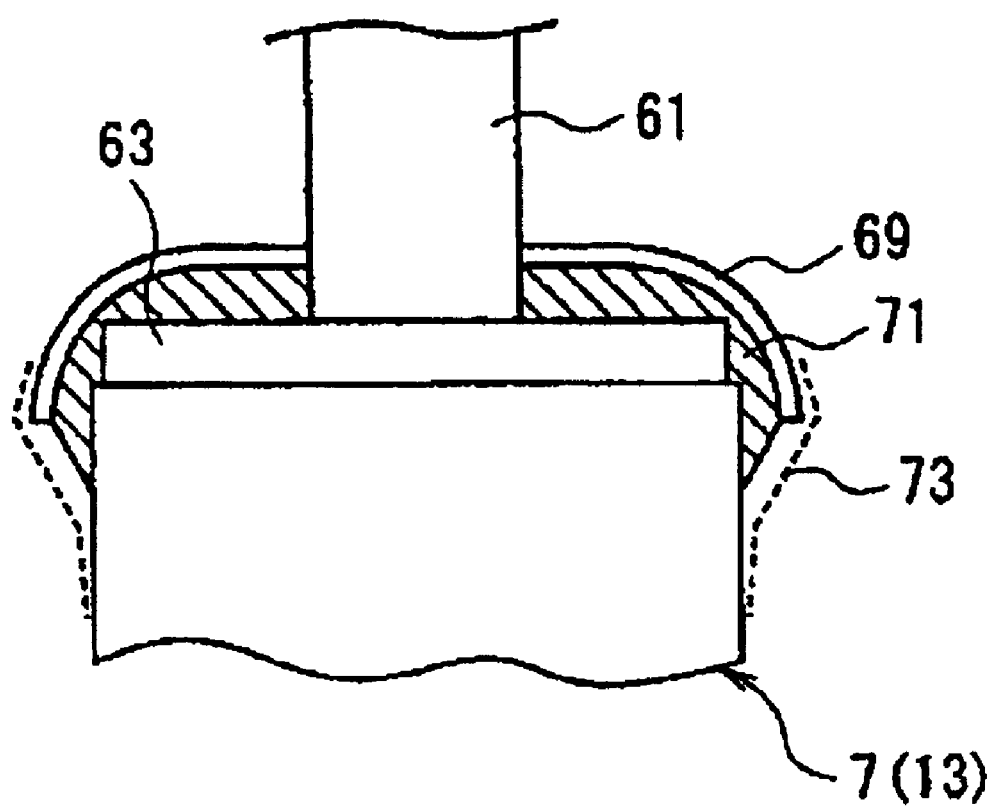
FIG. 15 is an outline drawing of a vacuum valve member illustrating a modification of the third embodiment of the present invention.
Figure 16:
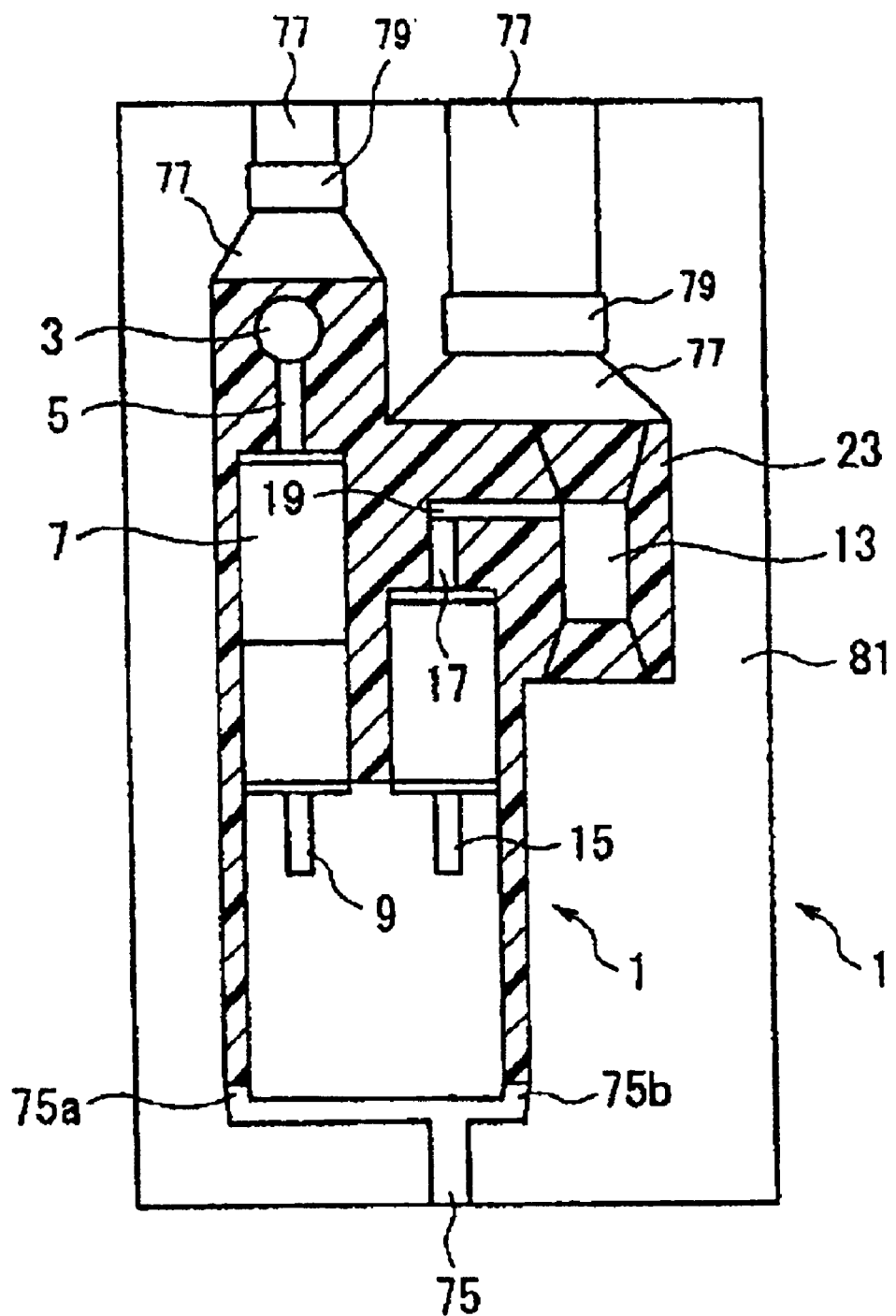
FIG. 16 is an outline drawing of a mold employed in the third embodiment of the present invention.

It should be added that in the third embodiment the inside of the metal caps 69 was formed of the same resin as was used in molding. However, as FIG. 15 shows, an elastomer 71 may also be used. With the elastomer 71, a room-temperature vulcanizer may be packed in this space when the metal caps 69 are being fitted, or the elastomer may be molded beforehand and inserted before fitting the metal caps 69. However, analysis has shown that in this case maximum stress is generated at the interface between the tip of the elastomer 71 and the insulation tube 35, as a result of which it is best to cover the boundary with glass tape 73 in order to prevent cracking induced by peeling in this area. The use of glass tape 73 allows resin to penetrate, strengthening the area and preventing peeling and cracking. Moreover, if high-speed molding is applied in the present embodiment, the inlet 75 may be divided into 75a and 75b as illustrated in FIG. 16, and a plurality of deaeration members 77 and resin pools 79 provided in the metal molds 81. The vacuum valves 7, 13 and conductors 3, 5, 19 etc. are introduced into the mold 81 and resin 23 is poured in. Because the inlet 25 is divided into a plurality of inlets, the resin 23 can be packed uniformly without any risk of its not flowing and cavities remaining. In FIG. 16 the inlet 75 is divided into 75a and 75b within the mold 81, but this can also be effected outside the mold 81. The resin 23 is pressurized and heated, and is packed into the metal mold as the reaction proceeds, driving the air out in the meantime. However, a void is produced at the tip. This void and the air within the mold are extracted through the deaeration members 77 and resin pools 79. Were it not for the presence of these members 77 and 79, the pressure within the mold would rise as the resin 23 was packed, and a cavity would be generated at the top. For the purpose of extracting air it is preferable that the gap in the deaeration member be as wide as possible. However, if it is too wide, the resin 23 which has been poured in will flow out through the deaeration members 77 or by way of the resin pools 79 through the deaeration members 77, and it will be impossible to obtain a satisfactory product. For this reason, it is preferable for the first deaeration member on the bottom side to be given a conical cross-section in order to make it easy for the resin 23 with voids to pass through. Meanwhile, the resin with voids is held in the resin pool 79. The gap in the deaeration member on the top side is made narrower. By the time the resin reaches this point, the reaction has proceeded, it has gelated and is stopped. Experiments performed by the authors of the present invention have revealed differences according to the objects, bulking agent to the resin, pouring pressure and other factors, but the flow of resin 23 was stopped while still under pressure when the gap in the deaeration member 77 at the bottom side was 0.1–1 mm and that at the top side 0.03–1 mm. If on the other hand there is only one deaeration member 77 and resin pool 79, the presence of a horizontal section within the mold means that voids and air here have nowhere to go, and as a result cavities and voids are formed. For this reason, as FIG. 16 demonstrates, deaeration members 77 and resin pools 79 are provided at a plurality of points according to the shape of the molded product so that the air and voids can be extracted. In this manner it was possible to obtain a switch gear 1 molded en bloc without any voids.

Figure 17:
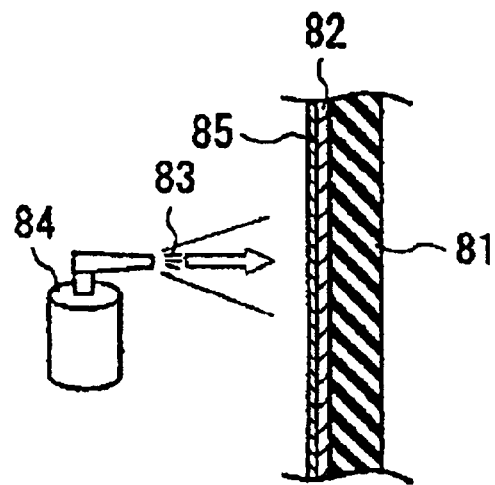
FIG. 17 is an outline drawing illustrating the formation of an electrically conductive layer in a fourth embodiment of the present invention.
Figure 18:
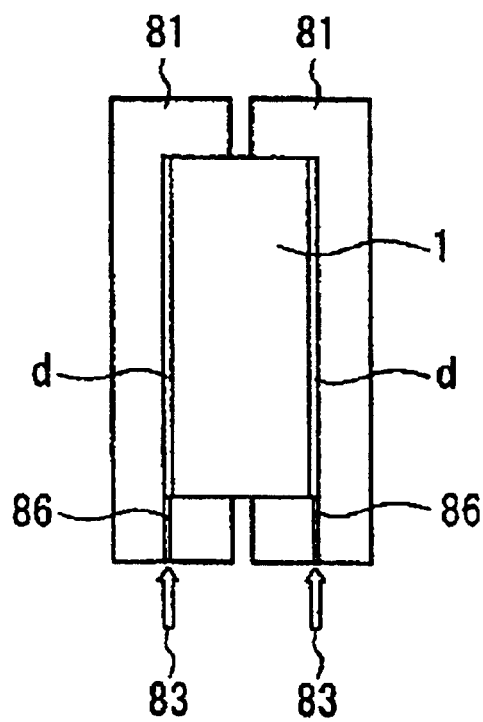
FIG. 18 is an outline drawing illustrating a modification of the fourth embodiment of the present invention.

There follows a description of a fourth embodiment with the aid of FIGS. 17 and 18.

The fourth embodiment relates to a method of molding an electrically conductive layer on the surface of the molded switch gear. In FIG. 17, the inner surface of the metal mold 81 is first processed with chlorine or a layer of mold release agent is baked on to the surface, after which a spray gun 84 filled with an electrically conductive coating agent 83 is used to form an electrically conductive layer 85 by spraying. Resin 23 is then poured into the metal mold 81, heated and cured to produce a molded product wherein the resin 23 and electrically conductive layer 85 form a single entity.

In the fourth embodiment, the resin is poured in before the electrically conductive coating 83 has completely hardened, with the result that adhesion between the resin 23 and coating 83 is good, making it possible to obtain a molded product with an electrically conductive layer 85 on the surface thereof, the two forming a single entity. The process is simplified because the electrically conductive layer can be formed during the process of molding. Another method of forming the electrically conductive layer during high-speed molding is illustrated in FIG. 18. Here the resin 23 of the switch gear 1 is gelated and cured until there is no risk of losing its shape. At this point the mold 81 and 81 is released slightly to create a gap d of 1–2 mm between the switch gear 1 and the mold 81, and the electrically conductive coating is poured in through an inlet 86. The metal mold 81 is then closed in such a manner as to allow the electrically conductive layer 85 to assume the prescribed thickness, and curing implemented until the electrically conductive layer 85 adheres to the switch gear 1. With high-speed molding, the metal mold 81 can be opened and closed easily, and the fact that the metal mold 81 is at a higher temperature than with regular molding means that it can be released in a short time. Inasmuch as the molded product is also at a high temperature, adhesion to the electrically conductive layer 85 is good, and by clamping the metal mold 81 it is possible to ensure the formation of an electrically conductive layer 85 of uniform thickness. The electrically conductive layer 85 can be formed in a single process without the need to heat the molded product, and as such is economical. In FIG. 17, an electrically conductive coating 83 was used to form the electrically conductive layer 85, but instead of the electrically conductive coating 83 is also possible to place a pre-impregnated epoxy electrically conductive sheet, that is to say, prepreg epoxy conductive sheet on the inner surface of the mold so that upon molding it creates an electrically conductive layer forming a single entity with the molded product. Furthermore, because in the high-speed method of molding which is illustrated in FIG. 18 the metal mold 81 is released at the stage when the resin has gelated, and the surface of the molded product is covered with a prepreg conductive sheet, which is then heated and pressurized by closing the metal mold 81, it is possible to obtain a molded product wherein the electrically conductive layer adheres firmly to the surface of the molded product and forms a single entity with it.

Figure 19:
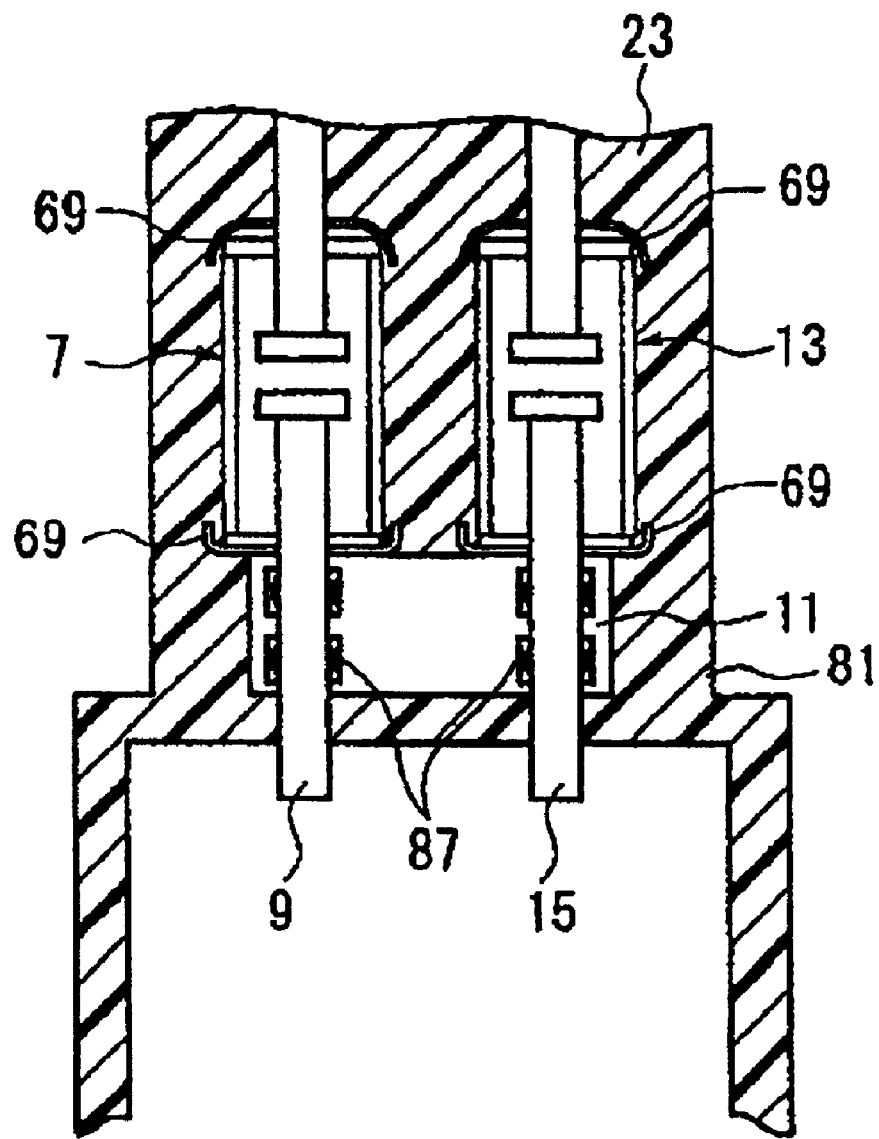
FIG. 19 is a cross-sectional drawing illustrating the principal section of the movable side of the switch gear in a fifth embodiment of the present invention.

There follows a description of a fifth embodiment of the present invention with reference to FIG. 19.

The fifth embodiment is a method of simultaneously molding the movable side conductors 9 and 15 in the molded switch gear illustrated in FIG. 2. The connecting member 11 to which a multi-contact band 87 has been attached, is set together with the vacuum valves 7 and 13 and movable side conductors 9 and 15 in a metal mold not illustrated in the drawing. If the current capacity of the switch gear 1 is large, a plurality of multi-contact bands 87 is attached. In this case it is also possible to attach stress-mitigating metal caps to the tops and bottoms of the vacuum valves 7 and 13.

Because in the fifth embodiment the connecting member 11 is assembled in the metal mold with the moving side conductors 9 and 15 which are required to move accurately, it is possible to adjust the dimensions with ease. Moreover, because the connecting member 11 is covered in resin 23 with a high degree of dielectric strength, only the movable side conductors 9 and 15 are exposed among the operational parts, allowing the insulation dimensions to be reduced.

Figure 20:
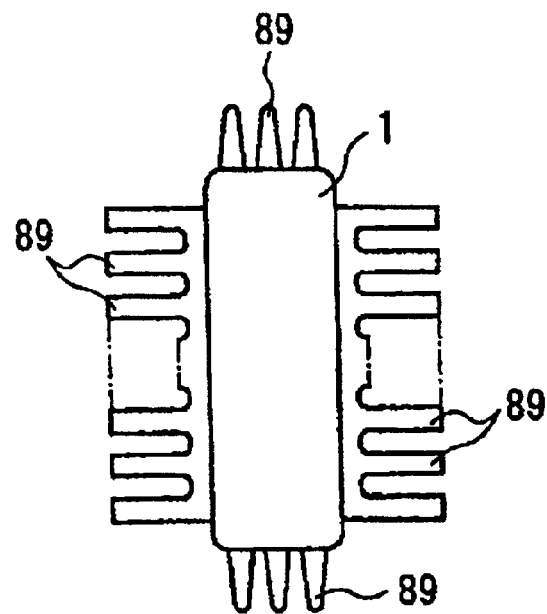
FIG. 20 is an outline top view of the switch gear in a sixth embodiment of the present invention.
Figure 21:
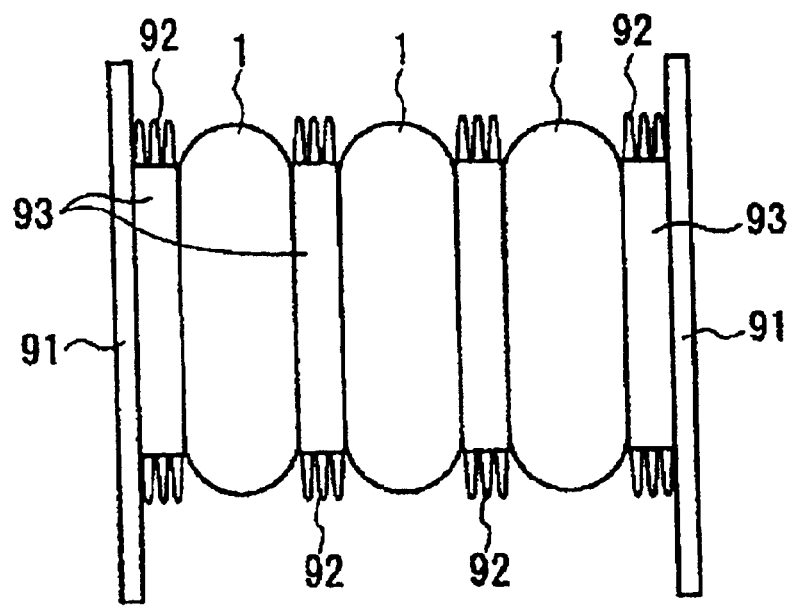
FIG. 21 is an outline top view of the three-phase switch gear illustrating a modification of the sixth embodiment of the present invention.

There follows a description of a sixth embodiment of the present invention with the aid of FIGS. 20 and 21.

In the sixth embodiment a fin 89 is attached to the surface of the switch gear 1 for use in cooling. FIG. 20 illustrates the sixth embodiment in outline. In the molded switch gear illustrated in FIG. 20, the outer surface of the switch gear 1 is shaped like a fin 89 in order to increase the surface area for use in cooling. The contact and connecting members in the switch gear 1 are the parts which generate heat, and this is the resistance loss of the conductors themselves, but it is particularly great in the contact and connecting members. The heat generated here is transferred to the surface by heat conduction in the resin, and is released there. The amount of heat released increases in proportion to the surface area. If the amount of heat released can be increased, the switch gear 1 can be made more compact. The position and shape of the heat-releasing fin 89 can easily be determined by the depth of the resin. FIG. 20 shows an example where the cooling fin 89 fashioned as a single entity in the resin, but it is also possible to embed a piece of metal in the resin layer of the switch gear 1, and after molding to fix a metal cooling fin 89 to the metal embedded in the resin layer, thus attaching the metal cooling fin 89 to the surface of the molded switch gear 1. In this case there is no problem as far as insulation is concerned if the metal cooling fin is attached to the surface of the molded switch gear 1 because this forms an electrically conductive layer. Indeed, cooling efficiency is improved because the heat conductivity of the metal is better than that of the resin. Attaching a metal fin 89 to the switch gear 1 in the same mold allows the current capacity to be increased and makes it possible to reduce the types of vacuum valve used within. This makes for greater standardization and production efficiency. What is more, it is possible to standardize the metal fin 89, and by changing the number and location thereof to apply the same switch gear 1 to use with different current capacities, thus improving production efficiency. It should be added even greater efficacy of heat release can be achieved by painting the outer surface of the fin 89 black. Where use is not made of the metal fin 89, the metal embedded in the resin can be used to fix it to the board and for coupling to other phase switch gears.

A modification of the present embodiment as illustrated in FIG. 21 may be adopted in order to increase cooling efficiency even further. FIG. 21 illustrates a switch gear 1 wherein heat pipes 93 with heating fins 92 are fixed between a plurality of switch gears 1 and board-side plates 91. The use of heat pipes 93 allows the movement of heat to be made more uniform and improves the cooling efficiency of the cooling fins 92 attached to the heat pipes 93. Fixing them also to the board-side plates 91 means that these become cooling surfaces as well, thus facilitating a further increase in cooling efficiency. It goes without saying that this can be improved still further if the heat pipes 93 are connected to a heat-exchanger.

Figure 22:
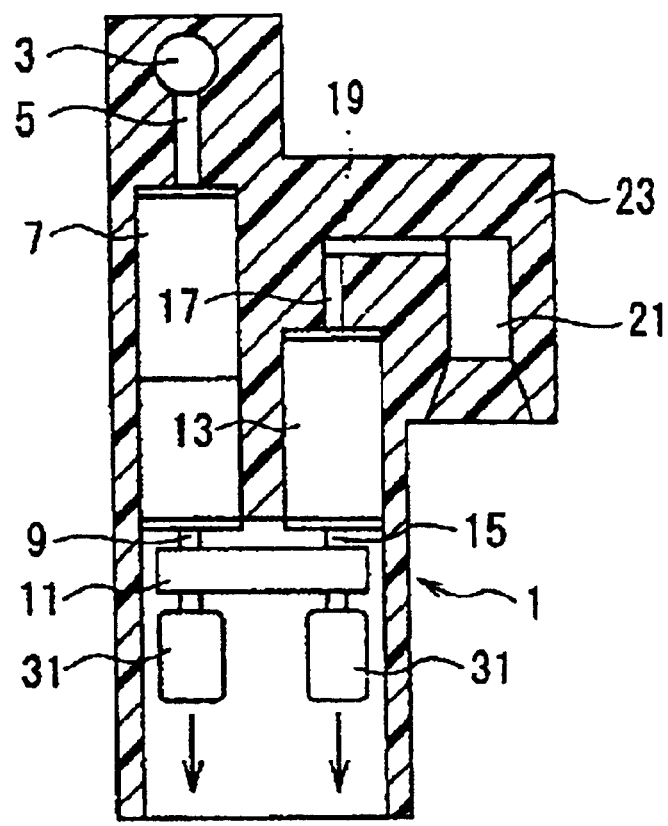
FIG. 22 is an outline drawing of the switch gear in a seventh embodiment of the present invention.
Figure 23:
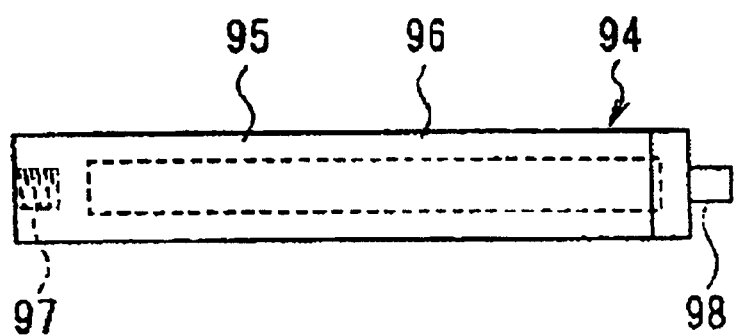
FIG. 23 is an outline drawing of a connecting conductor employed in the seventh embodiment of the present invention.

There follows a description of a seventh embodiment with reference to FIGS. 22 and 23.

The seventh embodiment, which is shown in outline in FIG. 22, permits the heat generated internally to be dispersed efficiently. In FIG. 22, the fixed conductors 5 and 17 of the vacuum valves 7 and 13 form a heat pipe connection conductor 94. FIG. 23 illustrates the heat pipe connection conductor 94 in outline. Within the copper or other conductor material 95 is a hollow section 96 into which is introduced a hear transport medium. One side forms a screw or other means of attachment 97, while the other side comprises a plug 98 through which the transport medium is introduced and which can be sealed and connected or attached. This heat pipe connection conductor 94 serves to connect the bus-line connection member 3 of the vacuum valves 7 and 13 to the cable head member 21, and is molded en bloc.

In the seventh embodiment, the heat generated in the switch gear 1 at the point of connection of the vacuum valves 7 and 13 is large, but because the interior of the vacuum valves 7 and 13 comprises a vacuum, the heat is dispersed along the conductor and then released from the surface by way of the resin. Use of the heat pipe connection conductor 94 serves to ensure that the heat of the conductor is uniform, and that the same applies to the heat released from the conductor to the resin. In this manner it is possible to increase the area of heat release, thus improving the cooling efficiency.

It should be added that the descriptions of the embodiments have hitherto focused on examples using two vacuum valves, but it goes without saying that a single vacuum valve is used where the valve itself has the functions of circuit breaker, disconnector and earth.

The method to which the present invention pertains makes it possible to supply in a cost-effective manner a switch gear wherein vacuum valves and other parts having the functions of a switch gear are molded en bloc, and which by virtue of the fact that an electrically conductive layer is provided on the surface thereof is compact and exhibits excellent cooling efficiency, productivity and crack resistance without resorting to the use of SF6 gas.

Obviously numerous additional modifications and variations on the present invention are possible in the light of the above teachings. It is therefore to be understood that within the scope of the appended claims the present invention may be practised otherwise than as specifically described herein.

What is claimed is:

1. A switch gear, comprising:

a switching apparatus having a vacuum circuit breaker and a vacuum disconnector;

an input member of said switching apparatus wherein electric power is input from an exterior;

an output member of said switching apparatus wherein electric power is output to said exterior; and said switching apparatus being molded in a resin layer together with said input member and said output member, said input and output members forming a t-junction inside the molded resin layer and outside the vacuum circuit breaker and the vacuum disconnector.

2. The switch gear according to claim 1, wherein an outer surface of said molded resin layer forms an earth layer.

3. The switch gear according to claim 1, further comprising:

a main metal mold for molding said switching gear, a separatable mold capable of molding either of said input member and said output member, and wherein said switch gear is molded in accordance with a structure and shape of said input and output members.

4. The switch gear according to claim 1, further comprising:

a current sensor for detecting an electric current of a bus-line; and a voltage sensor for detecting a voltage of said bus-line, wherein said current sensor and said voltage sensor are molded en bloc in such a manner that said current and voltage sensors double as supporting members for a conductor member.

5. The switch gear according to claim 1, wherein a molded potential transformer or arrester is fitted to one side of said T-junction.

6. The switch gear according to claim 1, further comprising:
- a plurality of conductive metal caps for electrically protecting said vacuum valve,
- wherein said conductive metal caps are fitted to both end surfaces of said vacuum valve in such a manner as to cover end surfaces of an insulation tube thereof, and said conductive metal caps are included with outer parts and molded.

7. The switch gear according to claim 6,
- wherein an elastomer is introduced into an area between said end surfaces of said vacuum valve and said conductive metal caps fitted thereto, while a high-strength fiber material is wrapped round between end surfaces of said conductive metal caps and said insulation tube of said vacuum valve so as to cover said end surfaces of said insulation tube, said conductive metal caps and said vacuum valve are included with the other parts and molded en bloc.

8. The switch gear according to claim 6,
- wherein said switch gear is molded with said resin and a bulking agent,
- said bulking agent for said molded resin comprises a fused silica bulking agent and fine elastomer particles, the latter is dispersed in a proportion of approximately 5–20% to said resin.

9. The switch gear according to any one of claims 1–2 and 3–8
- wherein said switch gear is molded en bloc by means of high-speed molding, wherein a curing accelerator is added to said resin in order to promote a reaction on an upside of 100° C., an interior of said metal mold is depressurized, said resin poured in and said metal mold released after 20–30 minutes.

10. The switch gear according to claim 1, further comprising:
- movable members of said vacuum valve, movable sides of said movable members being arranged in the same direction; and
- connecting members including sliding members on said movable sides, comprising a single conductor,
- wherein said movable members and said connecting members are molded en bloc with said vacuum valves.

11. The switch gear according to claim 1,
- wherein an outer surface of said molded switch gear assumes a shape of a fin for cooling.

12. The switch gear according to claim 1,
- wherein during molding thereof a metal fin is placed on an outer surface and said switch gear is molded en bloc along with said metal fin.

13. The switch gear according to claim 1,
- wherein during molding thereof a metal is embedded in said outer surface, and a heat pipe with a fin is attached to said metal.

14. The switch gear according to claim 1,
- wherein said switch gear is assembled in a three-phase shape with an aid of said heat pipe with fin, and fixed to a face of a board on both sides also with said aid of said heat pipe.

15. The switch gear according to claim 1,
- wherein said switch gear employs a sealed heat pipe connected to said vacuum valve with said switch gear.

* * * * *